United States Patent [19]
DiSpigna et al.

[11] Patent Number: 5,453,626
[45] Date of Patent: Sep. 26, 1995

[54] VALVE STEM THRUST MEASUREMENT SYSTEM

[76] Inventors: Angelo V. DiSpigna, 888 Mill Bend Dr., Lawrenceville, Ga. 30244; Daniel W. Bowman, 2861 W. Laurel St., Lecanto, Fla. 34461; William J. Brewer, 5640 SE. 23rd La., Ocala, Fla. 34471; Clifford K. Eubanks, 4 Edith St., Arlington, Mass. 02174

[21] Appl. No.: 267,156

[22] Filed: Jun. 28, 1994

[51] Int. Cl.⁶ .................................................. G01L 5/12
[52] U.S. Cl. .................... 251/129.12; 73/862.49; 73/862.621
[58] Field of Search ............ 251/129.12 I, 129.13; 73/168, 862.195, 862.637, 862.621, 862.49

[56] References Cited

U.S. PATENT DOCUMENTS

| | | | |
|---|---|---|---|
| 1,998,450 | 4/1935 | Davis | 73/862.49 |
| 2,367,017 | 1/1945 | Gardiner | 73/862.49 |
| 3,033,031 | 5/1962 | Gruber | 73/862.49 |
| 4,182,168 | 1/1980 | Desch | 73/862.49 |
| 4,542,649 | 9/1985 | Charbonneau et al. . | |
| 4,570,903 | 2/1986 | Crass | 251/129.12 |
| 4,660,416 | 4/1987 | Charbonneau et al. . | |
| 4,690,003 | 9/1987 | McNennamy et al. . | |
| 4,693,113 | 9/1987 | McNennamy et al. . | |
| 4,712,071 | 12/1987 | Charbonneau et al. . | |
| 4,735,101 | 4/1988 | Charbonneau et al. . | |
| 4,759,224 | 7/1988 | Charbonneau et al. . | |
| 4,831,873 | 5/1989 | Charbonneau et al. . | |
| 4,856,327 | 8/1989 | Branam et al. . | |
| 4,860,596 | 8/1989 | Charbonneau et al. . | |
| 4,891,975 | 1/1990 | Charbonneau et al. . | |
| 4,898,362 | 2/1990 | Leon | 251/129.12 |
| 4,912,984 | 4/1990 | McMennamy et al. . | |
| 5,000,040 | 3/1991 | Charbonneau ekt al. . | |
| 5,009,101 | 4/1991 | Branam et al. . | |
| 5,020,773 | 6/1991 | Tuft et al. | 251/129.12 |
| 5,052,424 | 10/1991 | Zerndt et al. | 251/129.12 X |
| 5,056,374 | 10/1991 | McMennamy et al. . | |
| 5,140,853 | 8/1992 | Branam et al. . | |
| 5,220,843 | 6/1993 | Rak | 73/862.49 X |
| 5,257,535 | 11/1993 | Evans . | |

*Primary Examiner*—Stephen M. Hepperle
*Attorney, Agent, or Firm*—James A. Hinkle

[57] ABSTRACT

A motor-operated-valve control system has a load cell positioned between a thrust bearing and a thrust seat in a stem housing of a motor-operated valve. The load cell is preferably toroidal with a stem-access aperture. Electrical leads from the load cell can be interfaced with readout and remote-control instrumentation.

39 Claims, 4 Drawing Sheets

VALVE STEM THRUST MEASUREMENT SYSTEM

BACKGROUND OF THE INVENTION

I. Field of the Invention.

The present invention relates generally to the field of measurement and control of thrust applied to valve stems of motor-operated valves used in nuclear, petroleum, chemical and other fluid-handling and gas-handling industries.

II. Description of the Prior Art.

Since occurrence of world-alarming nuclear-power-plant disasters following decades of their use in various parts of the world, there has been a proliferation of solutions to problems with motor-operated valves that are major components of plant operation and control. In various designs of nuclear power plants, there are hundreds of motor-operated valves that are directly or indirectly critical to their operation, control and safety. As for technological development generally, advancement for the nuclear industry is advancement for other industries using the same or similar components. Thus, the many improvements in relation to motor-operated valves for the nuclear industry have been applicable in chemical and related fields, the same as intended for this invention.

The trend in improvement of motor-operated valves has been to provide means and methods for their testing in order to improve their design or to replace them if they are nonfunctional. No improvements or solutions have been made to provide full-time self-analysis, self-correction, condition-readout, automatic control and remote control of motor-operated valves in the manner taught by this invention. None have provided a sensing means for automated, remote, non-intrusive or robotic analysis and control at a seat of thrust transfer as taught by this invention.

There have been a variety of problems with motor-operated valves (MOV). Between two extremes of operating conditions, MOVs leak if they are not closed tightly enough with a gear motor and related components referred to collectively as a "valve operator" that operates them. To an opposite extreme, valve gates of various types deform their valve seats or are themselves deformed by excessive closing pressure, referred to professionally as "stem thrust". Various forms of tripping devices are employed to turn off the valve operator at a predetermined stem thrust in order to achieve design sealing characteristics without damaging either the valve components or drive components. However, testing the tripping devices, the valve components, the valve operator and related controls has required shut-down and various levels of disassembly and reassembly that are time-consuming, hazardous and expensive.

One example of an instrument for measuring valve-stem thrust is described in U.S. Pat. No. 5,257,535 granted to Evans. The Evans patent taught positioning load sensors on opposite ends of a valve housing for measuring reaction thrust or stem stress with an MOV disassembled for calibration and testing under a simulation of "actual" operating conditions. Typical of other solutions to problems with MOVs, it did not provide full-time, continuous, in-use analysis for robotic controls.

In a series of U.S. Pat. Nos. 5,000,040, 4,891,975, 4,860,596, 4,831,873, 4,759,224, 4,735,101, 4,712,071, 4,660,416 and 4,542,649, a leading authority, Charbonneau et al, taught various methods and instruments for determining operating conditions of MOVs. Some were described as "non-intrusive" by not modifying a valve operator or its circuitry for testing during in-use conditions. However, as described in the latest of this series, U.S. Pat. No. 5,000,040, these, like other instruments and methods devised in the prior art, have been related to "simulating an operation-impairing load on the valve operator". The prior art devices have been means and methods for measuring power-related parameters, for calibrating and testing instead of in-use controlling in combination with full-time analysis of the valve operator.

The Charbonneau '649 patent, for instance, describes a system which is intended to measure valve-stem thrust directly and to provide dynamic trace of the actual stem load through the valve-operating cycle. The system and related method also monitor motor current, torque and trip-switch actuation over the operating cycle. These parameters are correlated with monitored thrust. To provide an indication of actual valve-stem thrust, however, Charbonneau et al teach an apparatus with which a compression load cell is attached to a free end of a valve stem at a position opposite the valve plug. This system is limited to providing direct measurement of the stem-thrust load only at ends of valve-opening strokes. Thus it measures only thrust at which an open-torque switch trips. This single measurement of stem thrust is then used to establish both the open and closed torque-switch settings. Thus, the Charbonneau et al apparatus is incapable of monitoring and measuring stem thrust directly over the entire operating cycle.

U.S. Pat. Nos. 5,056,374 and 4,912,984 granted to McMennamy et al described load-measuring means with an overload shear for measuring thrust load on a valve stem and for eliminating the load by circumventing the valve stem under overload conditions. Neither patent taught a continuous control and monitoring device as taught by this invention. Also granted to McMennamy et al, U.S. Pat. Nos. 4,693,113 and 4,690,003 described a valve-analysis and testing system which was attached to the valve operator for statistically calibrating the valve operator relative to valve load. Further different from this invention, these McMennamy systems did not teach direct positioning of a control sensor on a stem-thrust bearing.

In U.S. Pat. Nos. 4,856,327, 5,009,101 and 5,140,853, Branam et al teach positioning of a load cell directly between a valve and a valve operator. This provides direct measurement of stem thrust in order to eliminate errors associated with indirect methods of measurement. However, load cells in this position can be rendered inaccurate and ineffective for their intended purposes by material characteristics such as heat and radioactivity, by operational parameters and by other use-related conditions of many intended applications. This is particularly true for the nuclear industry in which hundreds of valves are required to be in perfect order for handling a wide variety of materials at various temperatures. In the chemical industry also, heat of valved material under high pressure can distort current flow and readings of pressure cells that are in direct contact with materials being handled. Construction to compensate for distortions resulting from direct contact with material conditions and use conditions is expensive at best and still not reliable as a result of such a wide variation of conditions. Construction with or without compensation for such distortions also is relatively expensive. Further, the Branam et al system must be employed originally, rather than attached to existing MOVs.

SUMMARY OF THE INVENTION

In accordance with the present invention, it is contemplated that in light of problems that exist in this field, objectives of this invention are to provide a motor-operated-valve-control system which:

Can be mounted onto existing motor-operated valves or produced for original equipment at low cost;

Provides full-time, non-intrusive thrust analysis under all in-use conditions without shutdown, disassembly or stopping any valve activity;

Is easy to learn to operate and easy to operate;

Interfaces with robotic controls that can be monitored and operated remotely;

Provides direct analysis of stem thrust immediately and accurately;

Provides a complete control system for motor-operated valves; and

Can be repaired and replaced quickly and easily.

A motor-operated-valve-control system to accomplish these and other objectives has a load cell positioned between a stem-thrust bearing and a thrust seat in a housing in a motor-operated valve. The load cell is preferably toroidal with a stem-access aperture. Electrical leads from the load cell can be interfaced with readout and remote-control instrumentation.

Other objects, advantages and capabilities of the invention will become apparent from the following description taken in conjunction with the accompanying drawings showing preferred embodiments of the invention.

DESCRIPTION OF THE PREFERRED EMBODIMENTS

Figure 1:
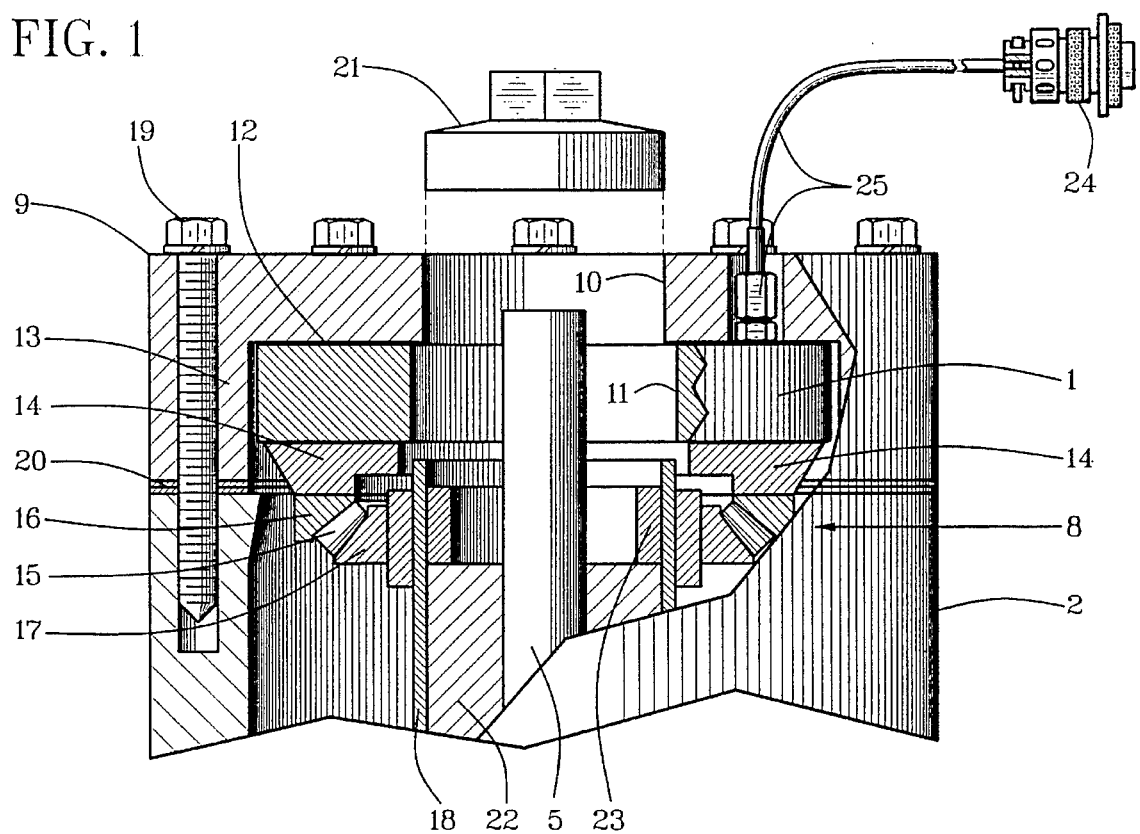
FIG. 1 is a partially cutaway side view of an embodiment with a load-cell cap as a load-cell-attachment means and with a combination shaft-thrust roller bearing.
Figure 2:
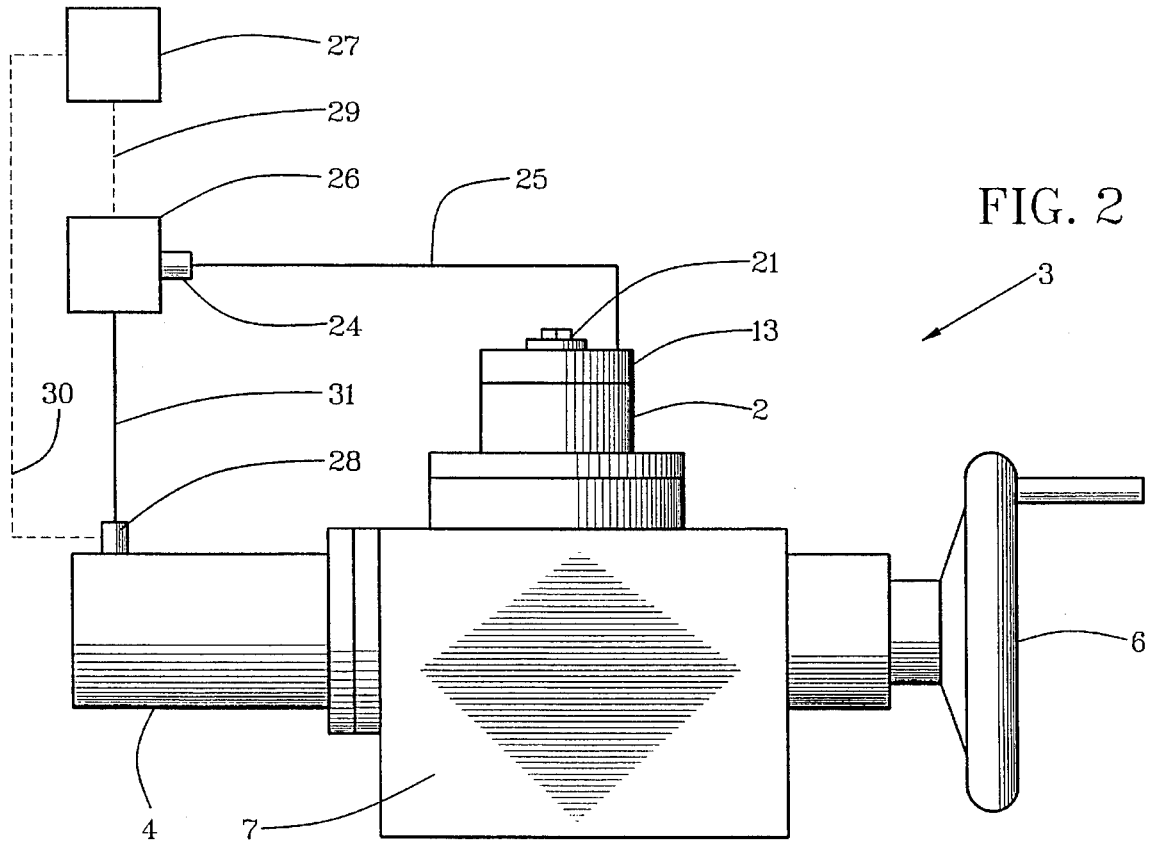
FIG. 2 is a plan view of a motor-operated valve in relation to a control system.

Referring to the drawings wherein like reference numerals designate corresponding parts throughout the several figures, reference is made first to FIGS. 1 and 2. A load cell 1 is sized and shaped to fit variously onto a stem housing 2 of a motor-operated valve 3. The motor-operated valve (MOV) 3 can be any of a variety of industrial valves that have a motor 4 to operate a valve stem 5 in the stem housing 2 that is usually at right angles to an axis of the motor 4. A handwheel 6 is usually provided to supplement or to override operation of a valve, not shown, in a valve housing 7. Such motor-operated valves are used commonly in nuclear, chemical and petroleum industries, often with hundreds of them at each facility.

Remote control of some form is essential for most applications. Sensing or evaluating pressure of a valve against its valve seat is fundamental for achieving desired valve sealing or openness reliably. An aspect of reliability of valve control is preventing distortion of a valve or valve seat or sticking of the valve on the valve seat as a result of over-pressuring the valve through the valve stem in order to achieve sufficiently tight closure or sealing. Sensing of pressure of a valve against its seat or against valved material in positions of openness has been accomplished in various ways previously, but never by positioning a sensor such as the load cell 1 between a stem-thrust bearing 8 and a means for attachment of the load cell 1 to the stem housing 2, even though this positioning has been found to be highly effective, reliable and relatively inexpensive.

In the FIG. 1 embodiment, a means for attachment of the load cell 1 to a proximal end of the stem housing 2 is a load-cell cap 9 having a stem-access aperture 10 in the load-cell cap 9 in line axially with a stem-access aperture 11 in the load cell 1. A retainer step 12 is positioned radially intermediate the stem-access aperture 10 in the load-cell cap 9 and an attachment sleeve 13 on the load-cell cap 9. A bearing seat such as a bearing sleeve 14 is extendible between a distal side of the load cell 1 and a proximal surface of a stem-thrust bearing 8 that in this embodiment is a combination roller bearing with rollers 15 at an angle between an outside race 16 and an inside race 17. The inside race 17 is in thrust-absorbance relationship between the stem-thrust bearing 8 and a drive sleeve 18. The outside race 16 is positioned intermediate the bearing sleeve 14 and a plurality of rollers 15. The load-cell cap 9 is attached to the proximal end of the stem housing 2 with fasteners 19 and tightened against one or more shims 20 for space adjustment. The stem-access aperture 10 in the load-cell cap 9 can be closed with plug 21 that is taper-threaded or taper-fit into the stem-access aperture 10. The drive sleeve 18 is rotated by various forms of gearing that are not a feature of this invention and, therefore, like a valve, not shown. In most MOV 3 structures, a stem nut 22 is positioned radially intermediate an inside periphery of the drive sleeve 18 and an outside periphery of the valve stem 5 and locked rotationally by a lock nut 23. Rotational travel of the motor 4 is transferred to linear travel of the valve stem 5 through the stem nut 22 with various conventional forms of worm gearing and thread gearing.

Figure 3:
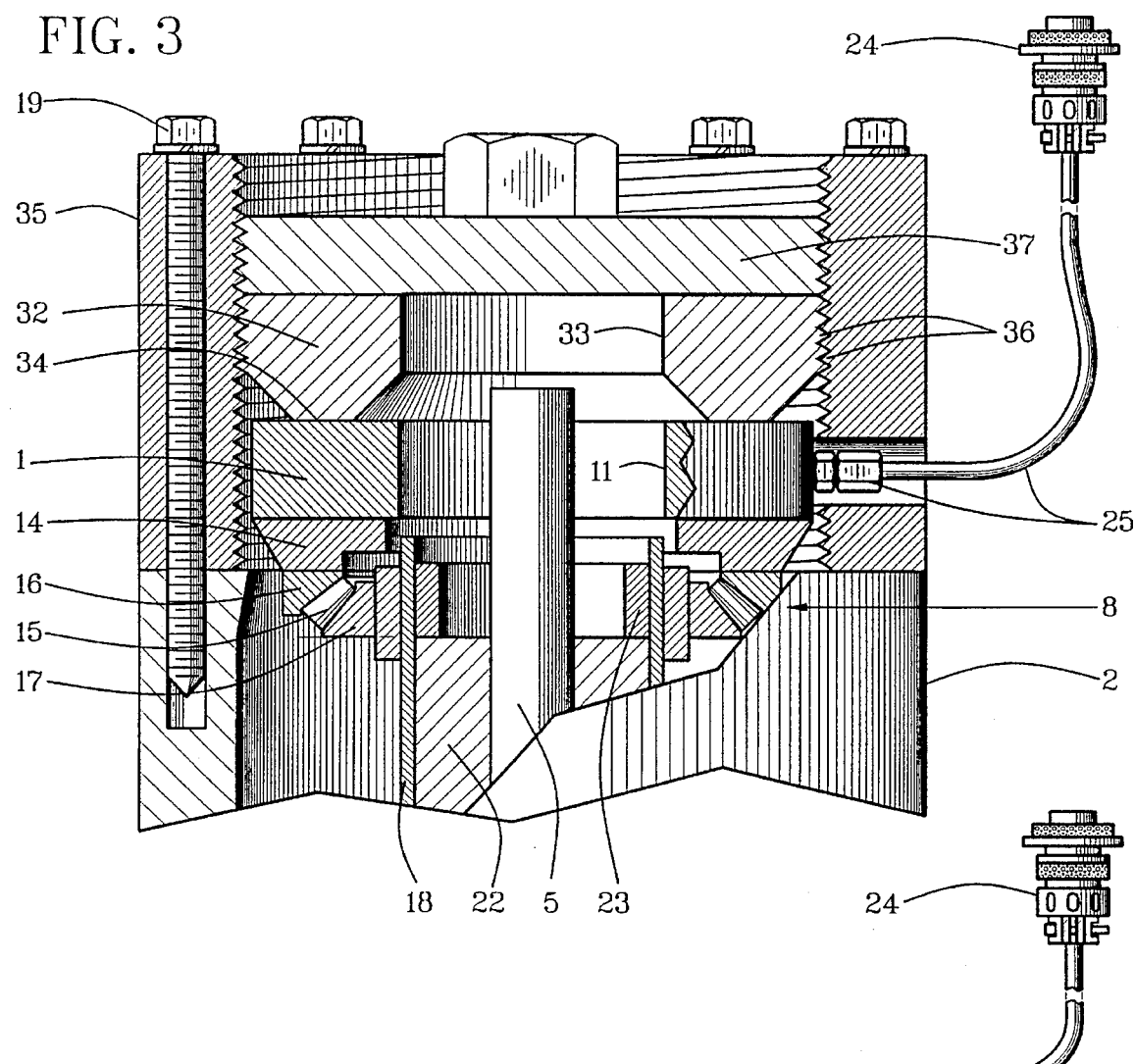
FIG. 3 is a partially cutaway side view of an embodiment with an adjustable collar as a load-cell-attachment means and with a combination shaft-thrust roller bearing.
Figure 4:
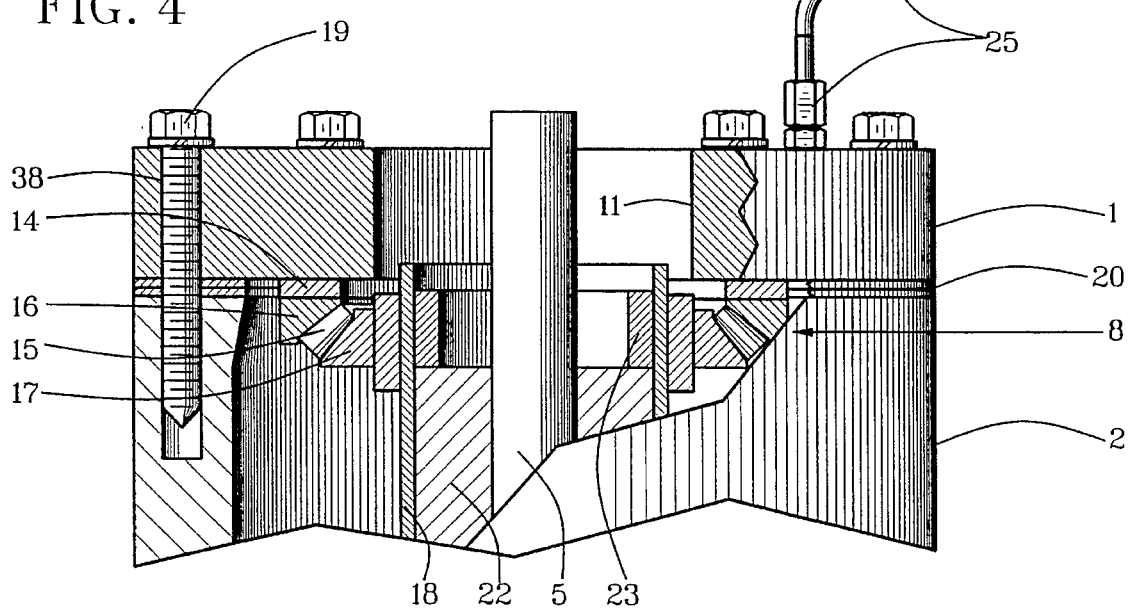
FIG. 4 is a partially cutaway side view of an embodiment with direct fastener attachment of the load cell and with a combination shaft-thrust roller bearing.

A pressure-readout means 24 is attached to the load cell 1 with a data-communication lead 25 for communication between the load cell 1 and the pressure-readout means 24 as illustrated in FIGS. 1 and 3–4. In FIG. 2, the pressure-readout means 24 is positioned in data-communication with a data analyzer 26. A programmable control means 27 can be provided for remote control of the motor 4 with an electronic switch 28. The programmable control means 27 can have wireless or wire telecommunication with the electronic switch 28 through a first communication line 29, a second communication line 30 and a third communication line 31. A high degree of control with effective feedback and sensing can be provided with a remote-control station such as represented by the programmable control means 27. Optional manual override of programmed control also can be provided through the programmable control means 27. Optionally also, the programmable control means 27 can be bypassed or omitted with control being provided directly through the third communication line 31 between the data analyzer 26 and the electronic switch 28. Thus, a highly effective and reliable motor-operated-valve control system can be provided within desired parameters.

Referring now to FIG. 3, the means for attachment of the load cell 1 to the proximal end of the stem housing 2 can be an adjustable collar 32 having an optional stem-access aperture 33 in line axially with the stem-access aperture 11 in the load cell 1. A retainer surface 34 of the adjustable collar 32 is positioned radially intermediate the stem-access aperture 33 and an attachment sleeve 35 to which the adjustable collar 32 is attachable adjustably in axial-distance relationship to the stem housing 2. Axial-distance adjustment and attachment of the adjustable collar 32 in relationship to the attachment sleeve 35 can be with machine threads 36 on an inside periphery of the attachment sleeve 35 and on an outside periphery of the adjustable collar 32. A collar lock nut 37 can be provided with or without an access orifice for thread-locking the adjustable collar 32 in desired distance relationship to the stem-thrust bearing 8. Other aspects of this embodiment are the same as described in relation to FIGS. 1 and 2.

Referring to FIG. 4, the means for attachment of the load cell 1 to the proximal end of the stem housing 2 can be a plurality of the fasteners 19 with which the load cell is attachable directly to the proximal end of the stem housing 2. Load-cell bolt orifices 38 are provided accordingly and the load cell 1 is positioned directly in contact with the bearing sleeve 14. Other aspects of this embodiment are the same as described in relation to FIGS. 1 and 2.

Reference is made here to FIGS. 5 through 10 which illustrate different bearings and bearing arrangements for use in combination with either of the means for attachment of the load cell 1 to the proximal end of the stem housing 2. Although either attachment sleeve 13 or 35, or no attachment sleeve could be employed, only attachment sleeve 13 is shown in FIGS. 5 through 10 as representative of an embodiment with either type of attachment means described in relation to FIGS. 1, 3 and 4. The only differences in FIGS. 5 through 10 are the components between the bearing sleeve 14 and the drive sleeve 18. The combination bearing with angled rollers 15 is used most commonly for present MOVs 3. It is the type of bearing with which this MOV control system will be used on existing equipment and for original equipment manufacture (OEM) until new equipment is designed specifically to employ this control system for particular use conditions and cost factors. Angled rollers are appropriate for most purposes with control systems not having pressure measurement at the thrust bearing as taught by this invention. However, the advantages of this invention render further improvement possible with stem-thrust bearings 8 having further-decreased thrust friction and increased thrust capacity with perpendicular roller thrust bearings or with ball bearings having still less thrust friction but less thrust capacity for particular design requirements. The lower thrust friction of perpendicular rollers and ball bearings allow higher accuracy of pressure readout if required. For less stringent design requirements, the stem-thrust bearings 8 can have greater friction with less readout accuracy but lower cost with ample but less wear life using friction bearings.

Figure 5:
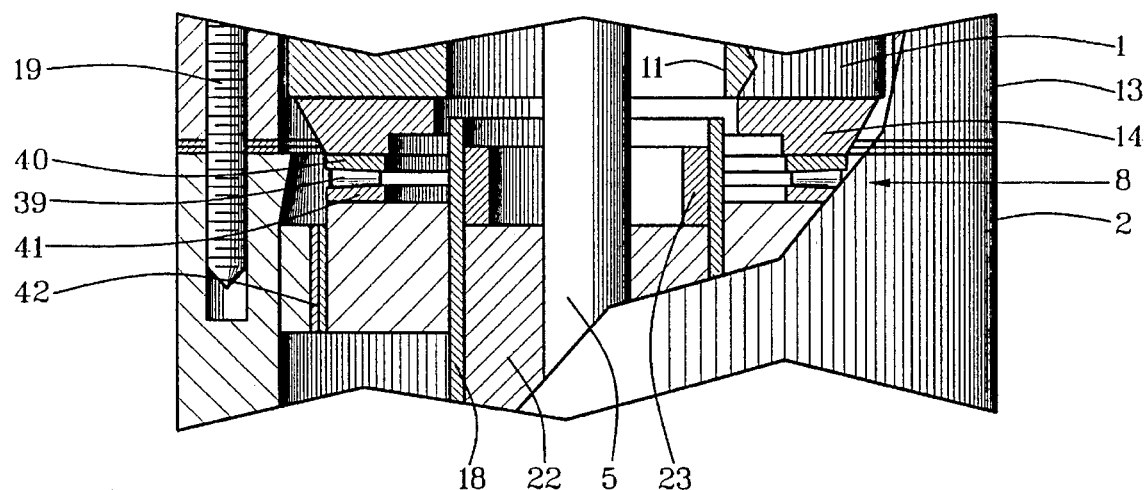
FIG. 5 is a partially cutaway sectional side view of an embodiment employing either means for attachment of the load cell to the stem housing and having a roller thrust bearing in combination with a friction shaft bearing with mated non-lubricated-solid bearing surfaces.
Figure 6:
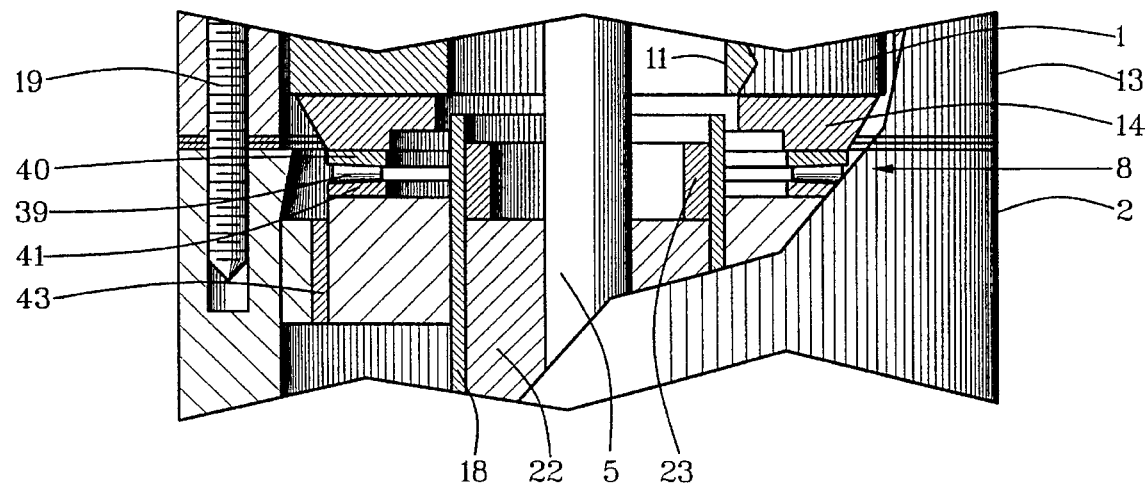
FIG. 6 is a partially cutaway sectional side view of an embodiment employing either means for attachment of the load cell to the stem housing and having a roller thrust bearing in combination with a friction shaft bearing with a single lubricated surface such as a lubricant-impregnated material.

In FIGS. 5 and 6, the stem-thrust bearing 8 is a linear-thrust bearing with a plurality of rollers 39 in a plane perpendicular to the drive sleeve 18 and positioned intermediate an outside race 40 and an inside race 41 to form a roller thrust bearing. With this roller thrust bearing, a radial-thrust bearing is added to absorb side pressures from conversion of rotation of gearing for the motor 4 to linear travel of the valve stem 5. In FIG. 5 the radial-thrust bearing is a surface-treated bearing 42 with non-lubricated-solid material applied to an outside-circumferential surface of a radial extension of the drive sleeve 18 in combination with a bearing-mated non-lubricated-solid material applied to an inside-circumferential surface of a radial extension of the stem housing 2. In FIG. 6, the radial-thrust bearing is a material-treated bearing 43 with preferably a layer of lubricant-impregnated bearing material positioned intermediate an outside-circumferential surface of a radial extension of the drive sleeve 18 and an inside-circumferential surface of a radial extension of the stem housing 2.

The non-lubricated-solid material applied to surfaces for surface-treated bearing 42 can be alloys of cobalt, molybdenum, nickel or chrome similar to the plasma coating or flame-spray coating applied to turbine bearings and sliding-contact surfaces of oil-field equipment for long use life without lubrication. Non-lubricated-solid coatings have slightly higher friction than lubricated bearings or non-friction roller or ball bearings. However, in the side-thrust use-conditions for this MOV-control system, the additional friction is not particularly significant when linear thrust is absorbed by straight-thrust roller bearings or ball bearings.

Figure 7:
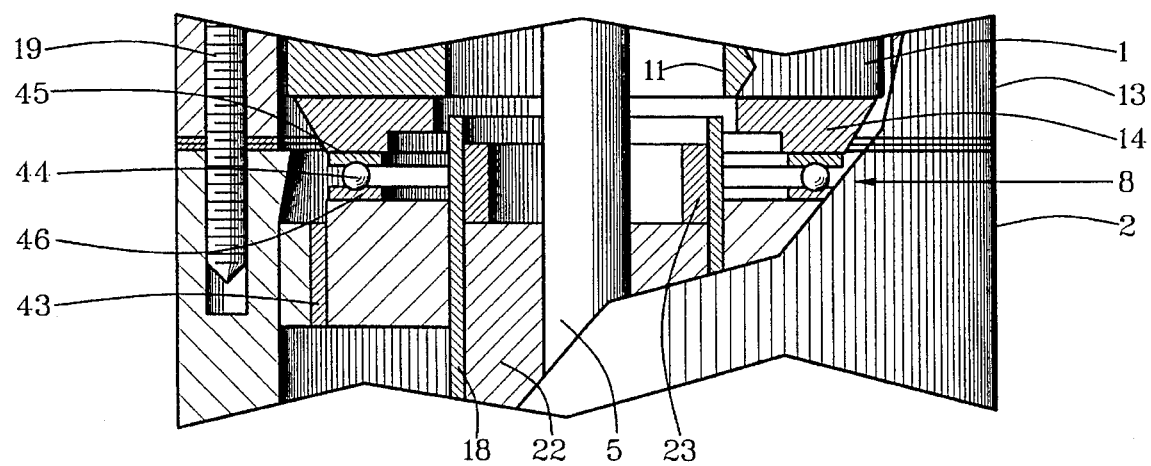
FIG. 7 is a partially cutaway sectional side view of an embodiment employing either means for attachment of the load cell to the stem housing and having a ball thrust bearing in combination with a friction shaft bearing with a single lubricated surface such as a lubricant-impregnated material.
Figure 8:
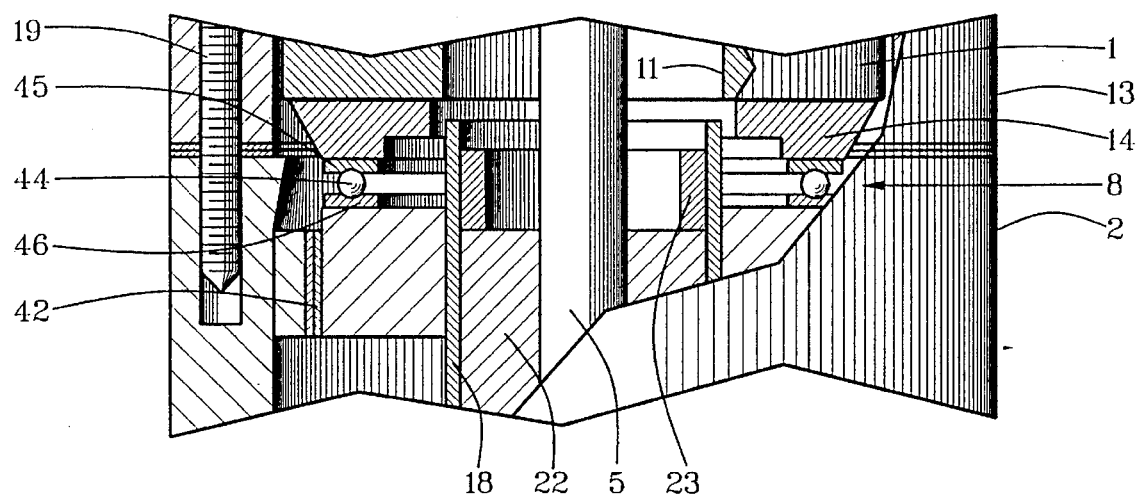
FIG. 8 is a partially cutaway sectional side view of an embodiment employing either means for attachment of the load cell to the stem housing and having a ball thrust bearing in combination with a friction shaft bearing with mated non-lubricated-solid bearing surfaces.

In FIGS. 7 and 8, the stem-thrust bearing 8 is a linear-thrust bearing with a plurality of ball bearings 44 in a plane perpendicular to the drive sleeve 18 and positioned intermediate an outside race 45 and an inside race 46 to form a ball thrust bearing. With this ball thrust bearing, a radial-thrust bearing is added to absorb side pressures from conversion of rotation of gearing for the motor 4 to linear travel of the valve stem 5. In FIG. 7 the radial-thrust bearing is a material-treated bearing 43 with a layer of lubricant-impregnated bearing material positioned intermediate an outside-circumferential surface of a radial extension of the drive sleeve 18 and an inside-circumferential surface of a radial extension of the stem housing 9. In FIG. 8, a surface-treated bearing 42 has non-lubricated-solid material applied to an outside-circumferential surface of a radial extension of the drive sleeve 18 in combination with a bearing-mated non-lubricated-solid material applied to an inside-circumferential surface of a radial extension of the stem housing 2.

Figure 9:
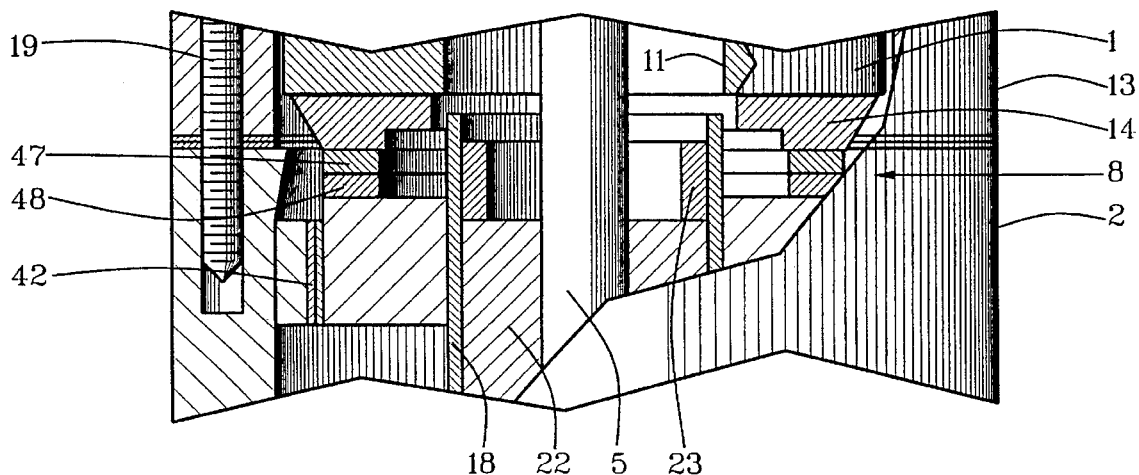
FIG. 9 is a partially cutaway sectional side view of an embodiment employing either means for attachment of the load cell to the stem housing and having a friction thrust bearing in combination with a friction shaft bearing with mated non-lubricated-solid bearing surfaces.
Figure 10:
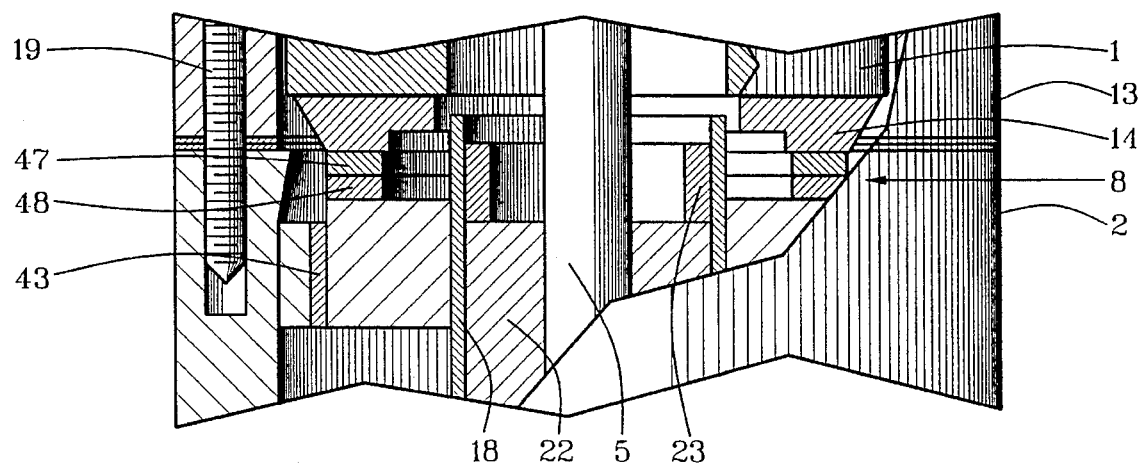
FIG. 10 is a partially cutaway sectional side view of an embodiment employing either means for attachment of the load cell to the stem housing and having a friction thrust bearing in combination with a friction shaft bearing with a single lubricated surface such as a lubricant-impregnated material.

In FIGS. 9 and 10, the stem-thrust bearing 8 is a linear-thrust bearing that is a friction type of bearing with an outside race 47 and an inside race 48 in a plane perpendicular to the drive sleeve 18. With this friction thrust bearing also, a radial-thrust bearing is added to absorb side pressures from conversion of rotation of gearing for the motor 4 to linear travel of the valve stem 5. In FIG. 9, the radial-thrust bearing is a surface-treated bearing 42 with non-lubricated-solid material applied to an outside-circumferential surface of a radial extension of the drive sleeve 18 in combination with a bearing-mated non-lubricated-solid material applied to an inside-circumferential surface of a radial extension of the stem housing 2. In FIG. 10, the radial-thrust bearing is a material-treated bearing 43 with a layer of lubricant-impregnated bearing material positioned intermediate an outside-circumferential surface of a radial extension of the drive sleeve 18 and an inside-circumferential surface of a radial extension of the stem housing 2.

Various modifications may be made of the invention without departing from the scope thereof and it is desired, therefore, that only such limitations shall be placed thereon as are imposed by the prior art and which are set forth in the appended claims.

What is claimed is:

1. A motor-operated-valve control system comprising:
   a load cell sized and shaped to fit onto a proximal end of a stem housing of a motor-operated valve;
   a bearing seat intermediate a proximal surface of a stem-thrust bearing and the load cell;
   a means for attachment of the load cell to the proximal end of the stem housing of the motor-operated valve with the load cell being in pressure-absorbance relationship between the stem-thrust bearing and the means for attachment of the load cell;
   a pressure-readout means; and
   a data-communication lead in communication between the load cell and the pressure-readout means.

2. A motor-operated-valve control system as described in claim 1 wherein the stem-thrust bearing is a roller-thrust bearing;
   the proximal surface of the stem-thrust bearing is a proximal side of an outside race of the roller-thrust bearing; and
   an inside race of the roller-thrust bearing is in thrust-absorbance relationship between the roller-thrust bearing and a drive sleeve of the motor-operated valve.

3. A motor-operated-valve control system as described in claim 1 wherein the stem-thrust bearing is a combination roller bearing with rollers positioned at an angle between an outside race and an inside race;
   the proximal surface of the stem-thrust bearing is a proximal side of the outside race; and
   the inside race is in thrust-absorbance relationship between the combination roller bearing and a drive sleeve of the motor-operated valve.

4. A motor-operated-valve control system as described in claim 1 and further comprising a data analyzer in data communication with the pressure-readout means.

5. A motor-operated-valve control system as described in claim 4 and further comprising a programmable control means in data communication with the data analyzer.

6. A motor-operated-valve control system as described in claim 5 and further comprising an electronic switch in programmatically operable relationship between the programmable control means and a motor of the motor-operated valve.

7. A motor-operated-valve control system as described in claim 1 wherein the means for attachment of the load cell to the proximal end of the stem housing of the motor-operated valve is a load-cell cap having a stem-access aperture in line axially with a stem-access aperture in the load cell;
   a retainer step is positioned radially intermediate the stem-access aperture in the load-cell cap and an attachment sleeve on the load-cell cap;
   the bearing seat is a bearing sleeve extendible between a distal side of the load cell and the proximal surface of the stem-thrust bearing; and
   a fastener means in fastener relationship between the attachment sleeve and the proximal end of the stem housing of the motor-operated valve.

8. A motor-operated-valve control system as described in claim 7 and further comprising at least one shim positioned intermediate the attachment sleeve and the proximal end of the housing of the motor-operated valve.

9. A motor-operated-valve control system as described in claim 7 wherein the stem-thrust bearing is a roller-thrust bearing;
   the proximal surface of the stem-thrust bearing is a proximal side of an outside race of the roller-thrust bearing; and
   an inside race of the roller-thrust bearing is in thrust-absorbance relationship between the roller-thrust bearing and a drive sleeve of the motor-operated valve.

10. A motor-operated-valve control system as described in claim 7 wherein the stem-thrust bearing is a combination roller bearing with rollers positioned at an angle between an outside race and an inside race;
    the proximal surface of the stem-thrust bearing is a proximal side of the outside race; and
    the inside race is in thrust-absorbance relationship between the combination roller bearing and the drive sleeve of the motor-operated valve.

11. A motor-operated-valve control system as described in claim 7 and further comprising a data analyzer in data communication with the pressure-readout means.

12. A motor-operated-valve control system as described in claim 11 and further comprising a programmable control means in data communication with the data analyzer.

13. A motor-operated-valve control system as described in claim 12 and further comprising an electronic switch in programmatically operable relationship between the programmable control means and a motor of the motor-operated valve.

14. A motor-operated-valve control system as described in claim 1 wherein the means for attachment of the load cell to the proximal end of the stem housing of the motor-operated valve is an adjustable collar having a stem-access aperture in line axially with a stem-access aperture in the load cell;
    retainer surface of the adjustable collar is positioned radially intermediate the stem-access aperture in the adjustable collar and an attachment sleeve to which the adjustable collar is attachable adjustably in axial-distance relationship to the stem housing;
    the bearing seat is a bearing sleeve extendible between a distal side of the load cell and the proximal surface of the stem-thrust bearing; and
    a fastener means in fastener relationship between the attachment sleeve and the proximal end of the stem housing of the motor-operated valve.

15. A motor-operated-valve control system as described in claim 14 wherein the stem-thrust bearing is a roller-thrust bearing;
    the proximal surface of the stem-thrust bearing is a proximal side of an outside race of the roller-thrust bearing; and an inside race of the roller-thrust bearing is in thrust-absorbance relationship between the roller-thrust bearing and a drive sleeve of the motor-operated valve.

16. A motor-operated-valve control system as described in claim 14 wherein the stem-thrust bearing is a combination roller bearing with rollers positioned at an angle between an outside race and an inside race;

the proximal surface of the stem-thrust bearing is a proximal side of the outside race; and the inside race is in thrust-absorbance relationship between the combination roller bearing and the drive sleeve of the motor operated valve.

17. A motor-operated-valve control system as described in claim 14 and further comprising a data analyzer in data communication with the pressure-readout means.

18. A motor-operated-valve control system as described in claim 17 and further comprising a programmable control means in data communication with the data analyzer.

19. A motor-operated-valve control system as described in claim 18 and further comprising an electronic switch in programmatically operable relationship between the programmable control means and a motor of the motor-operated valve.

20. A motor-operated-valve control system as described in claim 1 wherein the means for attachment of the load cell to the proximal end of the stem housing of the motor-operated valve is a plurality of fastener bolts with which the load cell is attachable directly to the proximal end of the stem housing, and the bearing seat is a bearing sleeve extendible between a distal side of the load cell and the proximal surface of the stem-thrust bearing.

21. A motor-operated-valve control system as described in claim 20 wherein the stem-thrust bearing is a roller-thrust bearing;

the proximal surface of the stem-thrust bearing is a proximal side of an outside race of the roller-thrust bearing; and an inside race of the roller-thrust bearing is in thrust-absorbance relationship between the roller-thrust bearing and a drive sleeve of the motor-operated valve.

22. A motor-operated-valve control system as described in claim 20 wherein the stem-thrust bearing is a combination roller bearing with rollers positioned at an angle between an outside race and an inside race;

the proximal surface of the stem-thrust bearing is a proximal side of the outside race; and the inside race is in thrust-absorbance relationship between the combination roller bearing and the drive sleeve of the motor-operated valve.

23. A motor-operated-valve control system as described in claim 20 and further comprising a data analyzer in data communication with the pressure-readout means.

24. A motor-operated-valve control system as described in claim 23 and further comprising a programmable control means in data communication with the data analyzer.

25. A motor-operated-valve control system as described in claim 24 and further comprising an electronic switch in programmatically operable relationship between the programmable control means and a motor of the motor-operated valve.

26. A motor-operated-valve control system as described in claim 1 wherein the stem-thrust bearing is a linear-thrust bearing in linear-thrust relationship between the motor-operated valve and the stem housing of the motor-operated valve, such that the stem-thrust bearing absorbs linear thrust and does not absorb side pressure of radial thrust from transfer of rotary travel of a motor to linear travel of the motor-operated valve;

a radial-thrust bearing is in radial-thrust relationship between a gear of a gear motor and a drive sleeve to which a stem nut is attached, such that radial thrust from rotation of the drive sleeve is absorbed separately by the radial-thrust bearing and not by the linear-thrust bearing; and the stem nut is in linear-drive relationship to the motor-operated valve.

27. A motor-operated-valve control system as described in claim 26 wherein the stem-thrust bearing is a roller-thrust bearing.

28. A motor-operated-valve control system as described in claim 26 wherein the stem-thrust bearing is a ball-thrust bearing.

29. A motor-operated-valve control system as described in claim 26 wherein the stem-thrust bearing is a friction bearing.

30. A motor-operated-valve control system as described in claim 26 wherein the radial-thrust bearing is a surface-treated bearing with non-lubricated-solid material applied to an outside-circumferential surface of a radial extension of the drive sleeve in combination with a bearing-mated non-lubricated-solid material applied to an inside-circumferential surface of a radial extension of the stem housing.

31. A motor-operated-valve control system as described in claim 26 wherein the radial-thrust bearing is a material-treated bearing with a layer of lubricant-impregnated bearing material positioned intermediate the drive sleeve and the stem housing.

32. A motor-operated-valve control system as described in claim 30 wherein the stem-thrust bearing is a roller-thrust bearing.

33. A motor-operated-valve control system as described in claim 30 wherein the stem-thrust bearing is a ball-thrust bearing.

34. A motor-operated-valve control system as described in claim 31 wherein the stem-thrust bearing is a roller-thrust bearing.

35. A motor-operated-valve control system as described in claim 31 wherein the stem-thrust bearing is a ball-thrust bearing.

36. A motor-operated-valve control system as described in claim 26 and further comprising a data analyzer in data communication with the pressure-readout means.

37. A motor-operated-valve control system as described in claim 36 and further comprising a programmable control means in data communication with the data analyzer.

38. A motor-operated-valve control system as described in claim 37 and further comprising an electronic switch in programmatically operable relationship between the programmable control means and a motor of the motor-operated valve.

39. A motor-operated-valve control system as described in claim 1 and further comprising a stem-access aperture in the load cell.

* * * * *